United States Patent [19]

Tranbarger et al.

[11] Patent Number: 5,173,333
[45] Date of Patent: Dec. 22, 1992

[54] APPARATUS AND METHOD FOR DISCHARGING STATIC ELECTRICITY ON THE INTERNAL SURFACE OF PLASTIC PIPE

[75] Inventors: Oren Tranbarger; Clarence R. McGinnis; David H. Strain, all of San Antonio, Tex.

[73] Assignee: Southwest Research Institute, San Antonio, Tex.

[21] Appl. No.: 692,581

[22] Filed: Apr. 29, 1991

[51] Int. Cl.$^5$ .............................................. B05D 7/22
[52] U.S. Cl. .................................... 427/236; 118/317; 118/323; 118/DIG. 10; 427/140; 427/290; 427/322; 427/421
[58] Field of Search ............... 427/140, 322, 236, 292, 427/290, 421; 118/317, 322, DIG. 10

[56] References Cited

U.S. PATENT DOCUMENTS

| | | | |
|---|---|---|---|
| 2,207,576 | 4/1940 | Brown | 361/228 |
| 3,164,747 | 1/1965 | Yahnke | 361/215 |
| 3,608,821 | 9/1971 | Simm et al. | 239/3 |
| 4,169,279 | 9/1979 | Friedman, Jr. et al. | 361/212 |
| 4,319,303 | 3/1982 | Thorn | 361/215 |
| 4,345,297 | 8/1982 | Check | 361/251 |
| 4,758,295 | 7/1988 | Sawgide et al. | 156/98 |

FOREIGN PATENT DOCUMENTS

| | | |
|---|---|---|
| 1482200 | 8/1977 | United Kingdom . |
| 2182745 | 5/1987 | United Kingdom . |
| 2195416 | 4/1988 | United Kingdom . |
| 0283192 | 9/1988 | United Kingdom . |

OTHER PUBLICATIONS

"Static Electric Pinholing Through Polyethylene Pipe" by Mark Staker 1989 American Gas Association Distribution Conference.

*Primary Examiner*—Janyce Bell
*Attorney, Agent, or Firm*—Jones, Day, Reavis & Pogue

[57] ABSTRACT

An apparatus (10) for discharging the internal surface of a plastic pipe (12) provides a saddle (32) having an internal cavity (35) formed therein for permitting threadable engagement of a shaft (24). The shaft (24) has a cutter (40) at one end for penetrating the plastic pipe (12) upon engagement. The shaft (24) also has a nozzle (28) formed adjacent to the cutter (40) for spraying an antistatic fluid (26) into the plastic pipe (12) for discharging the plastic pipe (12).

15 Claims, 4 Drawing Sheets

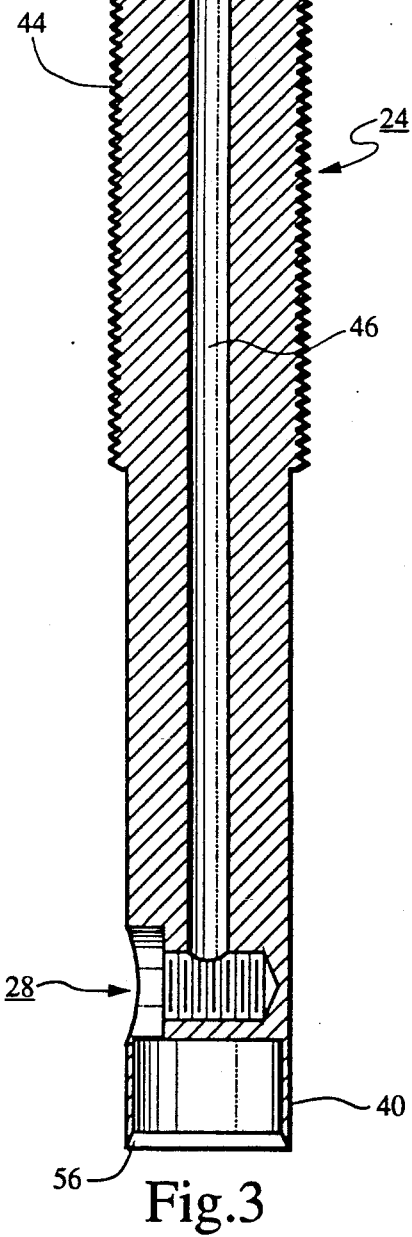
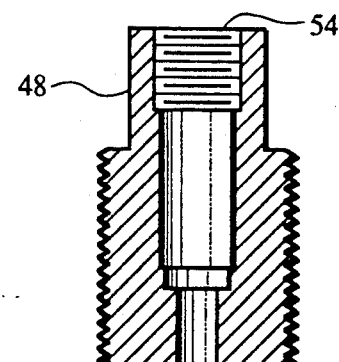
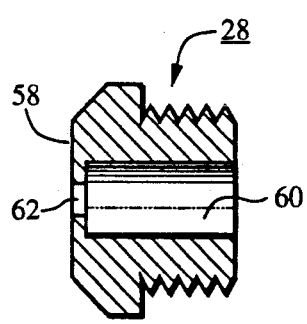
Fig.4A  Fig.4B
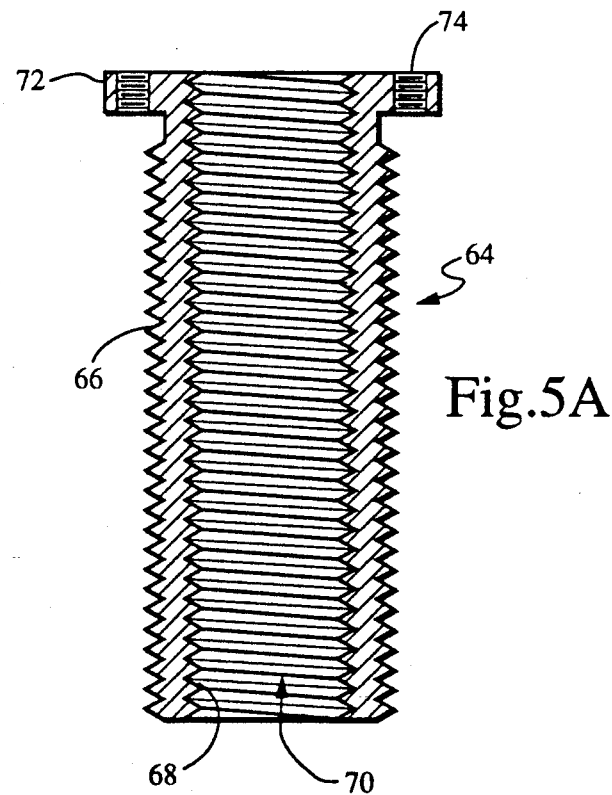
Fig.5A
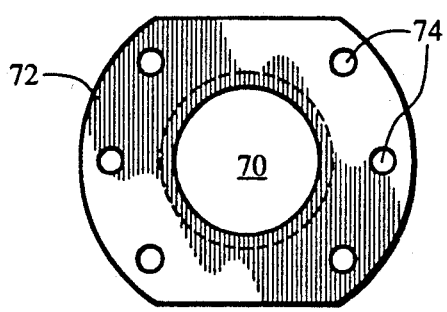
Fig.5B
Fig.3

5,173,333

APPARATUS AND METHOD FOR DISCHARGING STATIC ELECTRICITY ON THE INTERNAL SURFACE OF PLASTIC PIPE

TECHNICAL FIELD OF THE INVENTION

The invention relates in general to an apparatus and method for discharging electrostatic charge present on the surface of plastic pipe, and more particularly to an apparatus and method for discharging the internal surface of polyethylene pipe.

BACKGROUND OF THE INVENTION

The electrostatic charge buildup on the surface of plastic pipe, and in particular polyethylene pipe, is a hazardous problem when attempting to repair hydrocarbon gas pipelines because of potential spark discharges that may occur. It has been found that the buildup of charge can cause electrical shock to personnel that come in contact with a charged pipeline surface and can trigger a fire and explosion when discharged.

It is common for charge to be generated by triboelectrification (frictional charging). Charge can be stored on the surface of polyethylene pipe because of the inherent high resistivity of the polyethylene pipe. Particles, such as dust and rust, in the gas produce charge at the interior wall of the plastic pipe because of the triboelectrification. Triboelectrification can generate either a positive or a negative charge in the plastic pipe. It has also been observed that charge present inside these pipes induce charge buildup on the outside surface of the pipe.

Because of the presence of these charges, an electrical spark discharge can occur from metal objects or be experienced by personnel near the pipe when attempting to repair the pipe. Technology and procedures have been developed to discharge both the interior and exterior surfaces of polyethylene pipe. For example, in a report entitled "Control of Static Hazard in Plastic Pipe" which was prepared by Battelle (Columbus Laboratories), it was determined that water sprayers were effective for discharging charge on the interior wall of pipes but required access to the interior of the pipe. It was found that water on polyethylene pipe surfaces does not form a continuous wet film. Unfortunately, if the film coating of the fluid is not continuous, complete discharge of the interior surface of the pipe is not effective.

In addition, the above report discloses the use of X-ray as an effective method for discharging static charges on both the interior and exterior walls of pipe. Unfortunately, the use of X-ray is not practical for field applications. Unfortunately, X-ray equipment is cumbersome, expensive and potentially hazardous to operators.

Prior applications did not consider the use of an antistatic fluid in polyethylene pipe by selectively penetrating the pipe and spraying the antistatic fluid in the pipe to discharge the surface. Another problem which has yet to be confronted is the use of an antistatic fluid which will not degrade the integrity of polyethylene pipe. Since polyethylene pipe is a polymer, many common fluids tend to degrade the integrity of the pipe. In addition, since the antistatic fluid would be in the gas stream, it is imperative that the antistatic fluid not create problems in gas processing facilities such as the creation of hydrates or the reduction of the heating value of the gas.

A need has therefore arisen for an apparatus and method for discharging the internal surface of polyethylene pipe which avoids the prior difficulties with antistatic fluids and which is cost effective for use in remote areas.

SUMMARY OF THE INVENTION

The present invention disclosed herein comprises a method and apparatus for discharging the internal surface of a plastic pipe which eliminates or substantially reduces problems associated with prior discharging methods.

In accordance with one aspect of the present invention, an apparatus for discharging the internal surface of a plastic pipe with an antistatic fluid generally comprises a saddle which has a cylindrical cavity formed in its interior. The saddle is initially coupled to the plastic pipe. The saddle is designed to be selectively coupled to the plastic pipe by a bolting assembly contained thereon. After the saddle has been connected to the plastic pipe, a shaft is threadably engaged with the cavity of the saddle. The shaft has a cutter formed at one end which penetrates the plastic pipe upon threadable engagement.

Formed adjacent to the cutter, is a sprayer integrally formed with the shaft. The sprayer has a nozzle aligned substantially co-axial with the center-line of the plastic pipe for insuring complete coating of the plastic pipe when the antistatic fluid is sprayed into the plastic pipe. The spraying of the antistatic fluid into the plastic pipe provides a conductive path to ground for discharging the interior of the plastic pipe in accordance with the present invention.

It is a technical advantage of the present invention that a combination cutter and sprayer can be inserted into the plastic pipe for allowing antistatic fluid to evenly coat the interior surface of the plastic pipe which effectively discharges the internal pipe surface. In accordance with the invention, the apparatus can be reused for repeated applications to discharge the internal surfaces of plastic pipe.

BRIEF DESCRIPTION OF THE DRAWINGS

Other aspects of the invention and their advantages will be discerned after studying the detailed description in connection with the drawings in which:

FIG. 3 is a cross-sectional view of the shaft illustrating the combination cutter and sprayer configuration;

FIG. 4A is a cross-sectional of the nozzle;

FIG. 4B is a frontal view of the nozzle;

FIG. 5A is a cross-sectional view of a sleeve which is inserted into the saddle of the present invention; and FIG. 5B is a frontal of the sleeve.

DETAILED DESCRIPTION OF THE INVENTION

The present invention comprises an apparatus and a method for discharging the internal surface of a plastic pipe. In particular, the present invention is used to discharge the internal surface of polyethylene pipe with an antistatic fluid.

Figure 1:
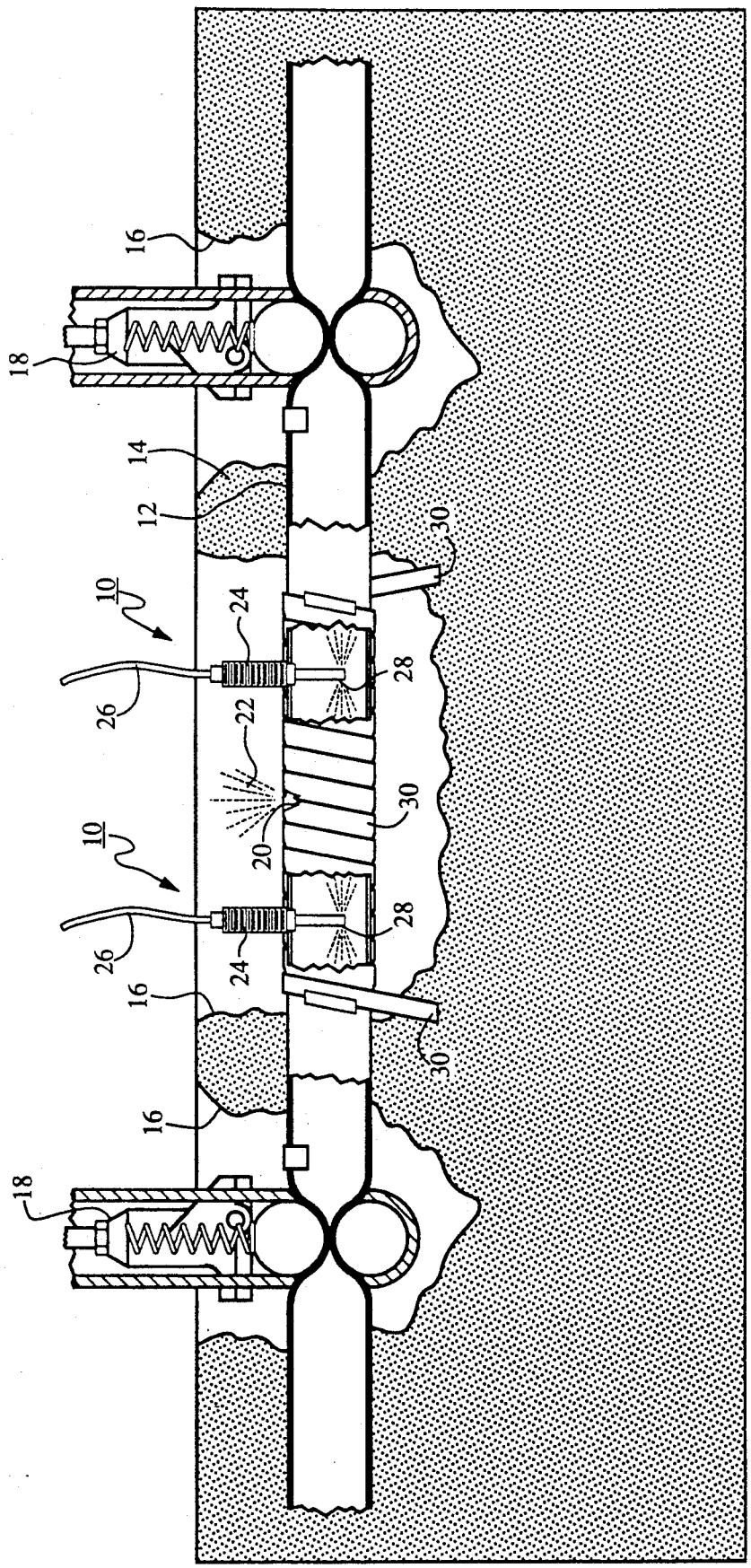
FIG. 1 is a side view of a plastic pipe illustrating the use of the apparatus of the present invention.

Referring initially to FIG. 1, a drawing representing a typical gas pipeline repair situation is depicted. The apparatus of the present is generally designated 10. Apparatus 10 is electrically grounded and selectively inserted into a plastic pipe 12. In its preferred embodiment, plastic pipe 12 is polyethylene pipe. Generally, pipe 12 transports a hydrocarbon gas and is buried in soil 14. When pipe 12 is damaged, bellholes 16 are dug to expose pipe 12 to the atmosphere. Prior to repairing pipe 12, clamps 18 are connected to pipe 12 to isolate the damaged area.

Once a leak 20 has been located in pipe 12, it is necessary to replace a portion of pipe 12 and eliminate any gas discharge. Leak 20 can be made several ways, such as an accidental puncture with a backhoe or other mechanical equipment. Leak 20 permits a gas source 22 to seep from its passageway and create a possible hazardous situation. Because charge is generated by triboelectrifcation (frictional charging), the surface of pipe 12 must be discharged to eliminate any potential fire or explosion.

In order to eliminate the internal discharge within pipe 12, apparatus 10 is coupled to pipe 12. Apparatus 10 has a shaft 24 contained therein which penetrates pipe 12. Shaft 24 has an antistatic fluid 26 connected to one end and a nozzle 28 formed at its other end. In operation, antistatic fluid 26 is passed through shaft 24 and out nozzle 28 to spray the antistatic fluid into the interior of pipe 12. It is desirable to have a complete coating of antistatic fluid on the surface of pipe 12 in order to discharge pipe 12.

Pipe 12 is discharged because antistatic fluid 26 permits the electrical charge from the interior of the plastic pipe 12 to flow through shaft 24 and from the plastic pipe 12 to ground.

To eliminate the external discharge from pipe 12, a low conductive film 30 can be wrapped around the external surface of pipe 12 and electrically grounded at each end to permit the electrical charge to dissipate from the surface of the pipe 12. The external discharge method can be one of several methods known in the art. However, in its preferred embodiment, the external discharge method is a method disclosed in co-pending patent application entitled "Method and Apparatus for Discharging the External Surface of Plastic Pipe" which has common assignees and is hereby incorporated by reference.

Figure 2A:
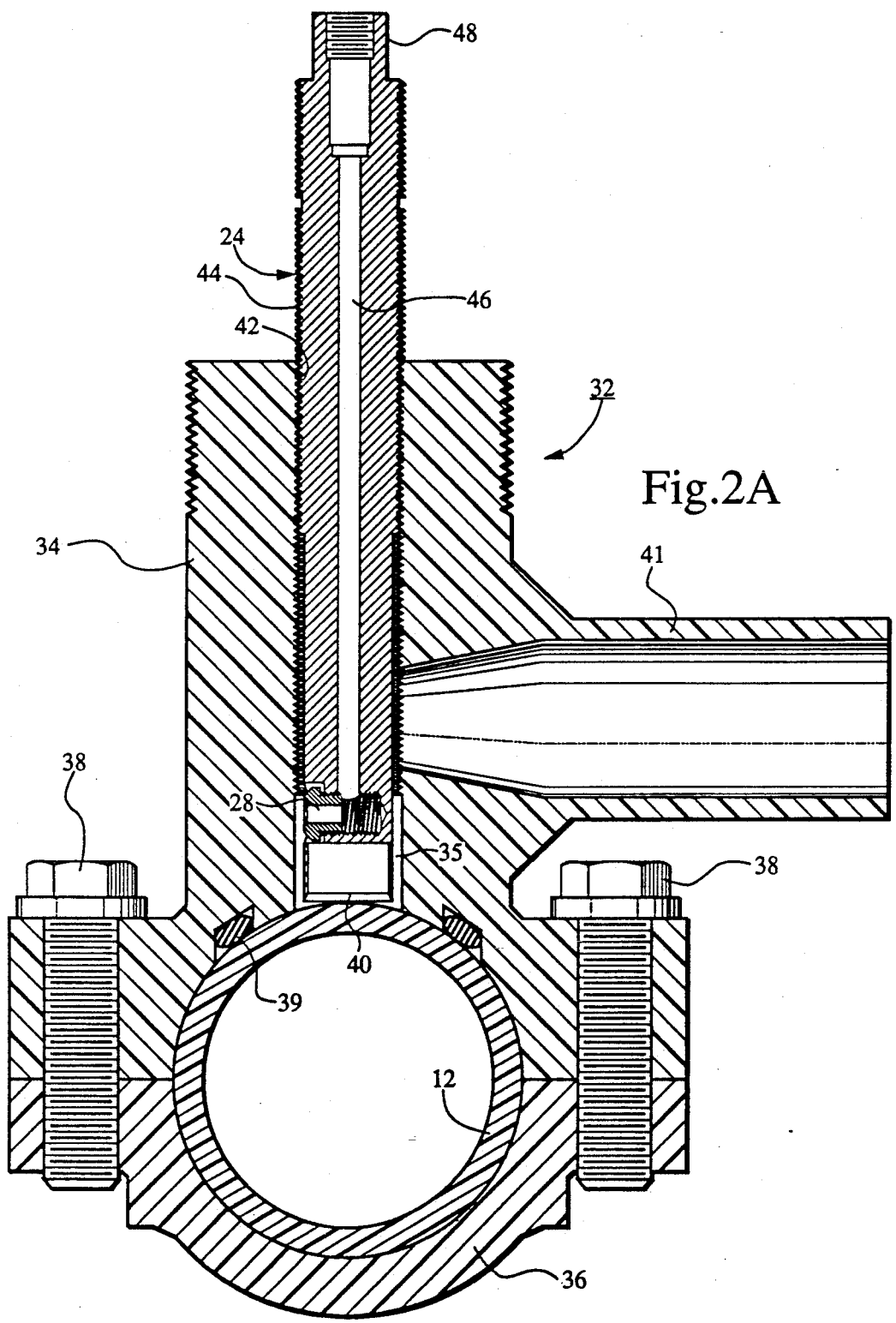
FIG. 2A is a cross-sectional view of a saddle showing a shaft with a cutter prior to penetration of the pipe.

Referring now to FIG. 2, a saddle 32 of apparatus 10 can be further explained. Saddle 32 generally comprises a casing 34. Casing 34 is preferably made of polyethylene and is a Perfection Permalock Tee ® disclosed in U.S. Pat. No. 4,730,636. The Perfection Permalock Tee ® is retrofitted for use in the present invention. It should be understood, however, that the Perfection Permalock Tee ® is not required to achieve the objective of the present invention.

Saddle 32 has a cavity 35 formed in its interior. As can be seen, cavity 35 is substantially cylindrical and runs from pipe 12 to the exterior of saddle 32. Saddle 32 also has a brace 36 threadably engageable with bolts 38 to make a bolting assembly or coupling device. When bolts 38 are engaged, brace 36 forces pipe 12 to press against O-ring 39. When O-ring 39 is engaged, there is an gas-tight seal between cavity 35 and pipe 12.

Cavity 35 has shaft 24 contained therein. Shaft 24 is threadably engageable with casing 34 by way of casing threads 42 and shaft thread 44. In addition, saddle 32 has an exit port 41 formed thereon. Exit port 41 is a feature of the Perfection Permalock Tee ® which permits gas to pass from pipe 12 to another line. In the present invention, exit port 41 is not used as an outlet line port.

Shaft 24 has a passageway 46 contained therein for permitting the access of antistatic fluid 26 (not shown) to be passed to pipe 12 upon engagement. Shaft 24 has a nut 48 at one end and a cutter 40 at its other end. It should be understood that nut 48 can be engaged by a socket wrench or a boss for rotating shaft 24. The interaction between nut 48 and cutter 40 will be more easily understood after reviewing the next figure.

Figure 2B:
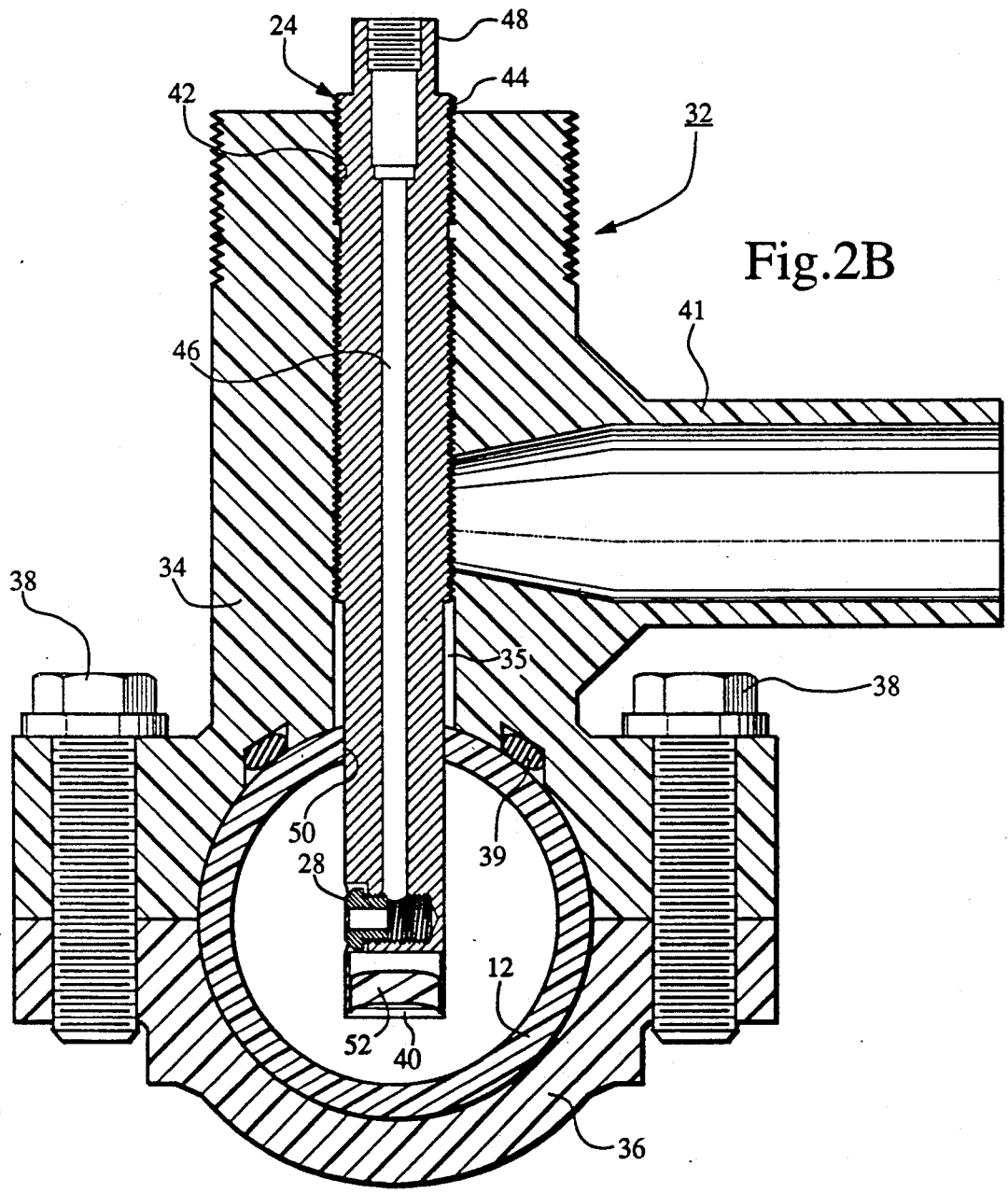
FIG. 2B is a cross-sectional view of the saddle showing the shaft with the cutter after penetration of the pipe.

Referring now to FIG. 2B, in operation, shaft 24 is rotatably threaded by turning nut 48 clockwise. This rotation advances shaft 24 closer to pipe 12. As can be seen, cutter 40 penetrates pipe 12 when shaft 24 is threadably engaged to create a hole 50. Cutter 40 has a plastic pipe plug 52 removed from pipe 12 when cutter 40 is engaged. Once shaft 24 has been sufficiently engaged, nozzle 28 is aligned substantially co-axial with the center-line of pipe 12 to allow for complete distribution of antistatic fluid 26 when spraying is conducted. The configuration of shaft 24 can be more easily understood after referencing the next figure.

Referring now to FIG. 3, shaft 24 is illustrated showing cutter 40 at its first end and nut 48 having a hex-head at its second end. Cutter 40 has a sharp edge 56 which is used for penetrating plastic pipe 12 upon engagement. Edge 56 is substantially circular which causes plug 52 (not shown) which is cut from pipe 12 to be cylindrical in shape. Shaft 24 has an a fitting 54 at its second end for permitting connection to antistatic fluid 26 (not shown). Fitting 54 may be one of several devices known in the art, but is preferably a quick-disconnect fitting. Antistatic fluid 26 passes from fitting 54 through passageway 46 and ultimately out of nozzle 28. A gauge (not shown) can be formed at the second end of shaft 24 for indicating the flow of antistatic fluid 26 (not shown) from nozzle 28. The configuration of nozzle 28 is more easily understood with reference to FIGS. 4A and 4B.

FIG. 4A is a cross-sectional view of nozzle 28. Nozzle 28 has a tip 58 and a cavity 60 formed therein. Referring to FIG. 4B, it can be seen that on the surface of tip 58, a slit 62 is formed therein for permitting fluid to pass therethrough and create a droplet type dispersion of fluid.

Referring to FIG. 5A, a sleeve 64 can be seen. Sleeve 64 is threadably engaged into the cavity of saddle 32 (not shown) by way of threads 66. Shaft 24 (not shown) is inserted into opening 70 by way of threads 68. Sleeve 64 has a lip 72 at one end which is used for connecting to an electrical ground.

FIG. 5B is a frontal view of sleeve 64. Sleeve 64 has lip 72 formed therefrom for permitting electrical connections 74 to be formed therein. Connections 74 are generally used to attach to a wire for permitting the discharge from the interior of pipe 12 (not shown) to ground. Sleeve 64 is an alternative embodiment of the present invention which allows for repeated use of the saddle 24 (not shown). In operation, when shaft 24 (not shown) is repeatedly engaged and disengaged with saddle 32 (not shown), the polyethylene material of saddle 32 (not shown) tends to deteriorate and cause a tightening effect when repeatedly engaged and disengaged. Sleeve 64 is designed to insert into saddle 32 (not shown) and to be left there permanently. Saddle 64 is made of metal which permits for repeated engagement and disengagement of shaft 24 (not shown), thus avoiding operational problems in the future due to wear of metal against plastic threads. In addition, sleeve 64 creates an electrical path between pipe 12 (not shown) and ground.

The operation of the present invention can be more easily understood by referring to FIG. 1 in conjunction with the following Operation section.

OPERATIONS

The present invention anticipates an apparatus and method for discharging internal surface of polyethylene pipe. However, several preceding steps need to be understood before totally appreciating the features of the present invention.

Most gas leaks are caused by third-parties, and a typical repair situation involves a hole or trench in the ground down to the pipe where a puncture has occurred. In this situation, a hydrocarbon gas could escape from the pipe.

In its preferred embodiment, two saddles are connected to the polyethylene pipe for completing the required steps. In using these saddles, the exterior surface of the pipe is initially sprayed with an antistatic fluid. This antistatic fluid is preferably a 65/35 mixture of (1) enzyme cleaner degreaser No. 109 manufactured by Enzymes, Inc., which is a proprietary mixture of a cleaner and degreasing agent; and (2) a composite of 50% water and 50% alkali metal, acetate salt and corrosion inhibitors manufactured by Chevron under the trademark Ice-B-Gon ® liquid, a runway de-icer. In a more general sense, the antistatic fluid is a mixture of water, a surfactant agent, and a deicing component. It should be understood that the deicing component is not needed if the gas does not experience sub-freezing temperature. It is preferable that the antistatic fluid not degrade the integrity of the polyethylene pipe, be flammable or hydrate in gas processing for consumer use which may be downstream.

The method for repairing a puncture in polyethylene pipe is as follows. First, it is necessary to excavate the bellholes upstream and downstream from the gas leak. After the bellholes have been excavated, the pipe is penetrated with the cutter of the shaft approximately 6 to 8 inches downstream below the designated squeeze off point. Antistatic fluid is then sprayed into the pipe to insure that there is complete coating of the pipe wall. This is done by selectively rotating the nozzle while the antistatic fluid is being sprayed. The spray period in each direction should be approximately 10 seconds. The saddle is left engaged for the next step. The polyethylene pipe is then squeezed off by a clamp to shut off the source of gas flow. For the purpose of example, the source will be referred to as upstream Next, in the downstream bellhole, the pipe is penetrated with the cutter of the shaft approximately 6 to 8 inches downstream above the designated squeeze off point. Again, antistatic fluid is directed toward one of the sidewalls and then downstream to discharge the area of the pipe where the squeeze off will occur. The antistatic fluid is sprayed for approximately 10 seconds in both directions. The second saddle is left in the engaged position. Thus far, all steps are performed to prevent any pinholing of the polyethylene pipe which may occur in the squeezing of each section. A clamp is applied to the pipe to squeeze off any gas flow from back pressure.

At this point, the gas will be shut off from both directions and after the gas cloud has dissipated from the area, the pipe can then be excavated and fully discharged internally and externally.

This external and internal discharge is conducted by excavating the pipe on both sides of the leak and discharging the external surface of the polyethylene pipe by using an antistatic polyethylene film wrap as described in the copending patent application entitled, "Method and Apparatus for Discharging the External Surface of Plastic Pipe." After the external surface of the excavated pipe is discharged, the saddles are removed from the bellholes upstream and downstream from the hole. The plastic pipe is then patched to insure that gas will not leave the holes created by the cutter. This method of patching is accomplished by using acceptable patching methods well known in the art.

Next, using one saddle, a hole is made by permitting the cutter to penetrate the pipe approximately one (1) foot upstream from the leak. The interior of the polyethylene pipe is discharged by spraying antistatic fluid at 10 second intervals toward the following directions: (1) one sidewall; (2) downstream; (3) opposite sidewall; and (4) upstream. After that step has been completed, the second saddle is connected to the polyethylene pipe and the cutter is engaged approximately one foot downstream from the leak. After engagement of the cutter and alignment of the nozzle, the interior portion of that polyethylene pipe is discharged by spraying at 10 second intervals toward the following directions: (1) one sidewall: (2) upstream (3) opposite side: and (4) downstream. After the interior of the polyethylene pipe has been discharged with both saddles, the saddles are removed and any external discharging film is removed from the pipe.

The pipe can now be cut away by methods well known in the art without fear of causing a spark and any potential fire or explosion from the hydrocarbon material. A new piece of pipe is then inserted to replace the damaged pipe with acceptable techniques well known in the art. After the new pipe has been connected, the clamps are disengaged to release the squeezed pipe in the upstream and downstream bellholes. After the pipe has been repaired, the bellholes are simply filled to complete the repair operation.

In its preferred embodiment, the saddle is connected on the side of the pipe and the nozzle is aligned co-axial with the center-line of the pipe and rotated 180 while the sprayer is activated. This process insures that the internal surface is completely coated.

In summary, an advantageous, economical method and apparatus have been disclosed which discharge the internal surface of polyethylene pipe to avoid any fire or explosion of hydrocarbon gases passing through the plastic pipe. It has been found that, due to the ease of operation, the present invention can be effectively used to repair polyethylene pipe without the fear of potential fires or explosions.

While the preferred embodiments of the invention and their advantages have been disclosed in the above detailed description, the invention is not limited thereto but only by the spirit and scope of the appended claims.

What is claimed is:

1. An apparatus threadably engageable with a saddle coupled to a plastic pipe for selectively cutting the plastic pipe and spraying an antistatic fluid in the plastic pipe for discharging an internal surface of the plastic pipe, which comprises:

a substantially cylindrical-shaped shaft having a first end and a second end, said shaft engageable with the saddle;

a cutter formed at said first end of said shaft for cutting the plastic pipe upon engagement of said shaft; and a nozzle formed adjacent to said cutter on said shaft for spraying the antistatic fluid in the plastic pipe to discharge the internal surface.

2. The apparatus as recited in claim 1, wherein the saddle comprises:

a T-shaped casing having a cylindrical cavity formed therein; and a coupling device connected to said casing for selectively engaging and disengaging the saddle to and from the plastic pipe.

3. The apparatus as recited in claim 1, wherein said cutter is substantially cylindrical-shaped, said cutter having a sharp edge for cutting the plastic pipe upon engagement of said shaft.

4. The apparatus as recited in claim 1, wherein said nozzle has a rectangular-shaped opening.

5. The apparatus as recited in claim 1, further comprising a gauge formed at said second end of said shaft for indicating the direction of the antistatic fluid from said nozzle.

6. The apparatus as recited in claim 5, wherein said gauge is aligned to position said nozzle substantially coaxial with the center line of the plastic pipe.

7. The apparatus as recited in claim 1, wherein said shaft further comprises a fitting formed at said second end for coupling the antistatic fluid with said shaft.

8. An apparatus for discharging an internal surface of a plastic pipe with an antistatic fluid, which comprises:

a saddle coupled to the plastic pipe, said saddle having a substantially cylindrical-shaped cavity formed therein;

a shaft having a first end and a second end, said shaft threadably engageable with said cavity;

a cutter formed at said first end of said shaft for penetrating the plastic pipe when threadably engaged; and a sprayer integrally formed at said first end of said shaft adjacent to said cutter for spraying the antistatic fluid in the plastic pipe to discharge the internal surface of the plastic pipe.

9. The apparatus as recited in claim 8, wherein said saddle comprises:

a T-shaped casing; and a bolting assembly coupled to said casing for selectively engaging and disengaging said saddle to the plastic pipe.

10. The apparatus as recited in claim 8, wherein said shaft further comprises a fitting at second end for coupling the antistatic fluid to said shaft.

11. The apparatus as recited in claim 8, wherein said cutter is substantially cylindrical, said cutter having a sharp edge at its end for penetrating the plastic pipe.

12. The apparatus as recited in claim 8, wherein said sprayer further comprises a nozzle formed therein for controlling the direction of the antistatic fluid when sprayed.

13. A method for discharging an internal surface of a plastic pipe with an antistatic fluid, which comprises the steps of:

coupling a T-shaped saddle to the plastic pipe;

threadably engaging a shaft of said saddle, said shaft having a cutter at its end for penetrating the plastic pipe upon engagement; and spraying the antistatic fluid through a nozzle formed on said shaft to discharge the internal surface of the plastic pipe, said step of spraying comprises the step of rotating said nozzle during said step of spraying to insure that the antistatic fluid completely coats the internal surface of the plastic pipe.

14. The method as recited in claim 13, further comprising the step of connecting the antistatic fluid to said shaft before said step of spraying.

15. The method as recited in claim 13, further comprising the step of removing said T-shaped saddle from the plastic pipe after said step of spraying.

* * * * *